United States Patent
Abe et al.

(10) Patent No.: US 7,354,045 B2
(45) Date of Patent: Apr. 8, 2008

(54) OIL RING

(75) Inventors: Tomoaki Abe, Aichi (JP); Keishi Nanno, Aichi (JP); Shiro Shibata, Saitama (JP); Hideshi Hitosugi, Saitama (JP)

(73) Assignees: Toyota Jidosha Kabushiki Kaisha, Toyota-shi, Aichi (JP); Nippon Piston Ring Co., Ltd., Saitama-shi, Saitama (JP)

( * ) Notice: Subject to any disclaimer, the term of this patent is extended or adjusted under 35 U.S.C. 154(b) by 30 days.

(21) Appl. No.: 10/527,637

(22) PCT Filed: Oct. 28, 2003

(86) PCT No.: PCT/JP03/13766

§ 371 (c)(1),
(2), (4) Date: May 18, 2005

(87) PCT Pub. No.: WO2004/040174

PCT Pub. Date: May 13, 2004

(65) Prior Publication Data

US 2006/0006604 A1     Jan. 12, 2006

(30) Foreign Application Priority Data

Oct. 29, 2002   (JP)  ............................ 2002-315031
Dec. 25, 2002   (JP)  ............................ 2002-375603

(51) Int. Cl.
*F02F 5/00*     (2006.01)
*B60T 11/236*     (2006.01)

(52) U.S. Cl. ...................... 277/435; 277/459

(58) Field of Classification Search ............... 277/434, 277/435, 459, 463–464, 466
See application file for complete search history.

(56) References Cited

U.S. PATENT DOCUMENTS 2,554,289 A     5/1951    Anderson (Continued)

FOREIGN PATENT DOCUMENTS

DE           4429649          2/1996

(Continued)

*Primary Examiner*—Vishal Patel
(74) *Attorney, Agent, or Firm*—Ladas & Parry LLP

(57) ABSTRACT

It is a main object of the present invention to provide an oil ring which is capable of reducing sliding friction even in a high speed revolution region of a piston, and capable of reducing the consumption of oil. To achieve the object, the present invention provides an oil ring which is formed into cross-section substantially of an I-shape that two rails are connected at a columnar portion thereof, wherein a sliding projection formed in each of the two rails comprises an outer side surface of sliding projection which forms an outer portion of the sliding projection, a inner side surface of sliding projection which forms an inner portion of the sliding projection, and a sliding surface which slides on a cylinder inner wall and forms a tip end of the sliding projection;
    wherein a taper angle of the outer side surface of sliding projection is in a range of 10° to 60°; and
    wherein the outer edge portion, where the outer side surface of sliding projection and the sliding surface are joined to each other, is formed into the curved surface, and the sliding surface has the curved surface sliding portion which is joined to the outer side surface of sliding projection and formed into a gently curved surface.

8 Claims, 7 Drawing Sheets

U.S. PATENT DOCUMENTS

| | | | | |
|---|---|---|---|---|
| 2,712,971 A | * | 7/1955 | Phillips | 277/444 |
| 4,045,036 A | * | 8/1977 | Shunta | 277/476 |
| 4,497,497 A | * | 2/1985 | Berti et al. | 277/463 |
| 7,077,402 B2 | * | 7/2006 | Katumaru et al. | 277/434 |

FOREIGN PATENT DOCUMENTS

| | | |
|---|---|---|
| DE | 19939002 | 8/2000 |
| EP | 0672850 | 9/1995 |
| JP | 42 62661 | 4/1971 |
| JP | 55-140449 | 4/1982 |
| JP | 57-63951 | 4/1982 |
| JP | 58-190809 | 7/1985 |
| JP | 60-97345 | 7/1985 |
| JP | 2-402079 | 8/1992 |
| JP | 4-95169 | 8/1992 |
| JP | 09-144881 | 3/1997 |
| JP | 071021 | 8/2002 |

\* cited by examiner

OIL RING

TECHNICAL FIELD

The present invention relates to an oil ring for an internal combustion engine, to an oil ring capable of reducing sliding friction and reducing oil consumption.

BACKGROUND ART

Conventionally, in an internal combustion engine, in order to enhance fuel economy, it is important to reduce friction in a piston. Especially in a piston ring of the internal combustion engine, it is required to enhance the quality of a pressure ring and the oil ring to reduce the friction. Also reduction of oil consumption is required as well as the reduction of the friction.

For example, the oil ring performs a scraping-off function of lubricating oil and an oil control function of controlling the consumption of the lubricating oil. In order to enhance these functions of the oil ring, a technique for thinning the axial width of the oil ring has been developed.

One example of a conventional thinned oil ring is shown in FIG. 4. In this example, an oil ring 1 has two rails 2 and 3 which are connected to each other by a column shaped web 4, and has an I-shaped cross section. In this example, the two rails 2 and 3 are formed in symmetric to each other. The oil ring 1 includes sliding projections 5 each provided with, at its tip end, a sliding surface 6 which slides with an inner wall 21 of a cylinder 20, outer side surface of sliding projections 7 forming outer side portions of the sliding projections 5, and inner side surface of sliding projections 8 forming inner side portions of the sliding projections 5. An outer peripheral groove 9 formed by connecting the rails 2 and 3 to each other by the web 4 is a groove in which oil scraped by the sliding surfaces 6 from a cylinder inner wall 21 is accommodated. The oil accommodated in the outer peripheral groove 9 passes through a large number of oil holes 16 formed in the web 4 and move toward an inner periphery of the oil ring 1.

In the oil ring having such a structure, in order to reduce the consumption of lubricating oil, an axial width of the oil ring, that is, a height "h" shown in FIG. 4 is reduced, thereby enhancing the oil control function of the oil ring. As the height "h" is smaller, the friction can be more reduced, this is advantageous for reducing the consumption of the lubricating oil. However, unlike a three-piece oil ring, the sliding surface always tries to contact flatly to a bore in the structure of a two-piece oil ring. Therefore, a contact surface formed at an initial stage is maintained for a long term.

Since a wedge effect does not contribute to the flat surface, an oil film of the sliding surface is thin, and friction becomes larger when a thin oil film is sheared off by a flat wide surface.

Since the oil ring is operated with fluid lubricant in most of regions of strokes, the velocity gradient in the oil film becomes larger when the oil film is thin, and the shearing force is increased as the velocity gradient is greater. Therefore, in a wide flat surface, friction becomes larger throughout the entire surface of a high shearing force generating region.

To avoid this, it is most important to reduce the contact width against a sliding surface.

Japanese Utility Model Publication No. 46-12405 discloses a technique in which in a piston ring having upper and lower rails whose axial widths of the piston ring are thick, the sliding surface of the piston ring is formed into a barrel like shape in order to prevent the seizing of the piston ring which may occur due to excessive pressure applied to an edge of the piston ring which comes into contact with an inner wall of the cylinder, when an inconvenience such as swinging, a lateral oscillation of the piston, accompanied by the vertical movement of the piston.

Furthermore, Japanese Patent Application Laid-open No. 2002-71021 discloses an oil ring having excellent oil consumption. In this publication, upper and lower rails of the oil ring are respectively provided with first tapered surface and second tapered surface, and an angle between the lower rail side sliding surface and the second tapered surface is set larger than an angle of the upper rail. Thus, the oil film is increased when the ring moves upward and is reduced when the ring moves downward, thereby reducing the oil consumption. However, this oil ring has a problem that it is necessary to form the upper and lower tapers such that they become different from each other and to judge the direction when the oil ring is assembled, and the work operation becomes complicated.

DISCLOSURE OF THE INVENTION

The present invention has been accomplished in view of the above problem, and a main object is to provide an oil ring which is capable of reducing the sliding friction even in a high speed revolution region of the piston, which has excellent oil consumption and which can easily be worked.

To achieve the object, the present invention provides an oil ring which is formed into cross-section substantially of an I-shape that two rails are connected at a columnar portion thereof, wherein a sliding projection formed in each of the two rails comprises an outer side surface of sliding projection which forms an outer portion of the sliding projection, a inner side surface of sliding projection which forms an inner portion of the sliding projection, and a sliding surface which slides on a cylinder inner wall and forms a tip end of the sliding projection; wherein a taper angle of the outer side surface of sliding projection is in a range of 10° to 60°; and wherein an outer edge portion, where the outer side surface of sliding projection and the sliding surface are joined to each other, is formed into a curved surface, and the sliding surface has a curved surface sliding portion which is joined to the outer side surface of sliding projection and formed into a gently curved surface.

In the present invention, by forming the sliding projection into the above described shape, when the oil ring is adversely inclined and obliquely contacts against the cylinder inner wall, the outer edge portion which comes into contact with the cylinder inner wall can be contacted at its curved surface. Therefore, it is possible to prevent concentration of excessive pressure at the outer edge portion, and to reduce the sliding friction.

Further, the invention also provides an oil ring which is formed into cross-section substantially of an I-shape that two rails are connected at a columnar portion thereof, wherein a sliding projection formed in each of the two rails comprises an outer side surface of sliding projection which forms an outer portion of the sliding projection, a inner side surface of sliding projection which forms an inner portion of the sliding projection, and a sliding surface which slides on a cylinder inner wall and forms a tip end of the sliding projection; wherein the at least a portion from an outer edge portion, where the outer side surface of sliding projection and the sliding surface are joined to each other, of the outer side surface of sliding projection is formed into a curved surface; and wherein the outer edge portion is formed into a curved surface, and the sliding surface has a curved surface sliding portion which is joined to the outer side surface of sliding projection and formed into a gently curved surface.

In the present invention, like the above mentioned invention, the sliding friction can be reduced by providing the sliding surface with the curved surface sliding portion. Further, in the outer side surface of sliding projection, a portion with a curved surface is formed on at least a part from the outer edge portion. With this configuration, the outer edge portion can be formed into more gently curved surface. Therefore, when the oil ring is adversely inclined and obliquely contacts against the cylinder inner wall, it is possible to prevent excessive pressure applied at the outer edge portion, and thus, an effect of reducing the sliding friction can be obtained by this as well.

In the above mentioned invention, it is preferable that the curved surface sliding portion and the inner side surface of sliding projection are joined to each other. By forming the entire sliding surface into the curved surface sliding portion, the sliding surface always comes into contact with the cylinder inner wall at its curved surface and thus, the compliance to the cylinder inner wall is excellent, and the sliding friction can be reduced.

In the above mentioned invention, it is preferable that a radial width of the oil ring, which is from the portion where the curved surface sliding portion and the outer side surface of sliding projection are joined to each other to the portion where the sliding surface and the inner side surface of sliding projection are joined to each other, is from 3 μm to 100 μm.

When the width is in the above mentioned range, the sliding friction can be reduced without deteriorating the scraping-off function of lubricating oil and the oil control function of the oil ring.

In the above mentioned invention, it is possible that an inner edge portion where the inner side surface of sliding projection and the sliding surface are joined to each other is formed into a curved surface, and the sliding surface has an inner curved surface sliding portion which is joined to the inner side surface of sliding projection and formed into a gently curved surface In the above mentioned invention, it is preferable that a taper angle of the inner side surface of sliding projection is in a range of 0° to 30°. By setting the taper angle of the inner side surface of sliding projection in the above mentioned range, the angle in the oil ring formed by the sliding surface and the inner side surface of sliding projection can largely be secured and thus, it is possible to prevent excessive pressure from concentrating and together with the shape of the sliding surface, the sliding friction can be reduced.

BEST MODE FOR CARRYING OUT THE INVENTION

Hereinafter, the oil ring of the present invention will be explained in detail. The oil ring of the present invention can be classified into two embodiments according to the difference in the shape of an outer side surface of sliding projection which forms an outer portion of a sliding projection. To begin with, the first embodiment will be explained.

A. First Embodiment

In the first embodiment, the oil ring is an oil ring which is formed into cross-section substantially of an I-shape that two rails are connected at a columnar portion thereof, wherein a sliding projection formed in each of the two rails comprises an outer side surface of sliding projection which forms an outer portion of the sliding projection, a inner side surface of sliding projection which forms an inner portion of the sliding projection, and a sliding surface which slides on a cylinder inner wall and forms a tip end of the sliding projection; wherein a taper angle of the outer side surface of sliding projection is in a range of 10° to 60°; and wherein an outer edge portion, where the outer side surface of sliding projection and the sliding surface are joined to each other, is formed into a curved surface, and the sliding surface has a curved surface sliding portion which is joined to the outer side surface of sliding projection and formed into a gently curved surface.

In this embodiment, by forming the sliding projection into the above described shape, when the oil ring is adversely inclined and obliquely contacts against the cylinder inner wall, the outer edge portion which comes into contact with the cylinder inner wall can be contacted at its curved surface. Therefore, it is possible to prevent concentration of excessive pressure at the outer edge portion, and to reduce the sliding friction.

The oil ring of this embodiment having such a merit will be explained specifically by using the drawings.

Figure 1:
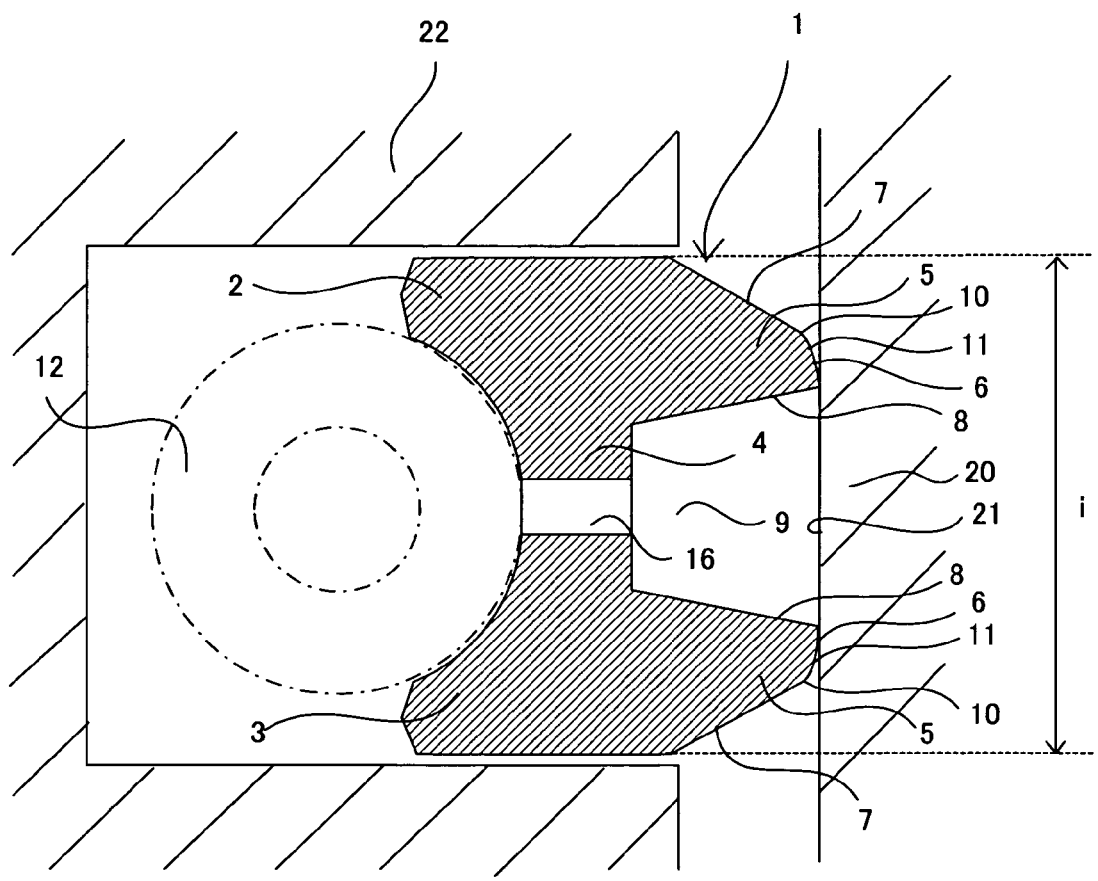
FIG. 1 is a schematic sectional view showing one example of an oil ring of the present invention.

FIG. 1 is a schematic sectional view showing one example of an oil ring of this embodiment. The oil ring 1 shown in this example is formed into cross-section substantially of an I-shape that two rails 2 and 3 are connected at a columnar portion web 4, and the two rails 2 and 3 are formed symmetric to each other.

The oil ring 1 comprises sliding projections 5 with sliding surfaces 6, which slide on an inner wall 21 of a cylinder 20, formed at their tip ends. Each of the sliding projection 5 comprises an outer side surface of sliding projection 7 which forms an outer portion of the sliding projection 5, and a inner side surface of sliding projection 8 which forms an inner portion. An outer peripheral groove 9, which is formed by connecting the rails 2 and 3 to each other by the web 4, is a groove in which lubricating oil scraped off by the sliding surface 6 from the cylinder inner wall 21 is accommodated. The lubricating oil accommodated in the outer peripheral groove 9 passes through a large number of oil holes 16 formed in the web 4, and moves toward the inner periphery of the oil ring 1.

In the oil ring 1 of this embodiment having the above described structure, an outer edge portion 10, which is a portion where the sliding surface 6 and the outer side surface of sliding projection 7 are joined to each other, is formed into a curved surface. The sliding surface 6 comprises a curved surface sliding portion 11 which is joined to the outer side surface of sliding projection 7 and is formed into a gently curved surface. A taper angle of the outer side surface of sliding projection 7 is formed to be in a predetermined range.

In the present embodiment, by forming the sliding projection 5 into the above described shape, when the oil ring 1 is inclined, sliding friction generated when the outer edge portion 10 comes into strong contact with the cylinder inner wall 21 is prevented from being increased.

That is, if inconvenience is generated such as fluttering in which the oil ring 1 is lifted in the groove of the piston 22 and is brought into unstable state, the oil ring is vertically moved in the groove of the piston 22 and is inclined. If the oil ring 1 is inclined in this manner, the outer edge portion 10 of either one of the upper and lower rails 2 and 3 is pushed against the cylinder inner wall 21 strongly. Therefore, there is a problem that the sliding friction is increased. Further, such increase of the sliding friction leads to inconvenience such as an increase of the consumption of the lubricating oil, and deterioration of the oil control function.

Figure 7:
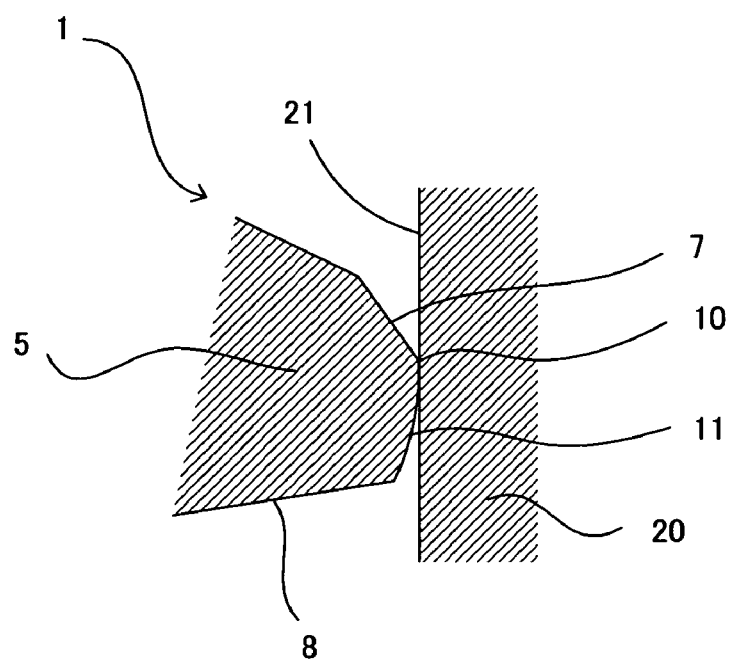
FIG. 7 is a schematic sectional view showing that even if the oil ring of the present invention is inclined, edge contact dose not occur.

FIG. 7 is a schematic sectional view showing a state in which the outer edge portion is in contact with the cylinder inner wall when the oil ring of the embodiment is inclined. As shown in FIG. 7, when the oil ring 1 is inclined in this embodiment, outer edge portions 10 of the upper and lower rails come into contact with the cylinder inner wall 21 at their curved surfaces and thus, it is possible to prevent excessive pressure from concentrating on the outer edge portions 10. Therefore, the oil ring of the present embodiment can reduced the sliding friction.

Furthermore, FIG. 1 shows a coil expander 12 which comes into contact with the inner periphery of the oil ring 1 having the above structure, urges the oil ring 1 radially outward, thereby pushing the oil ring against the cylinder inner wall 21. FIG. 1 shows an example of the two-piece oil ring comprising the oil ring 1 and the coil expander 12.

The oil ring of this embodiment having such merits and other expander will be explained below in detail.

1. Oil Ring

Generally, the oil ring is provided for scraping excessive lubricating oil on the cylinder inner wall and for suppressing the consumption of lubricating oil to a proper level. The oil ring of this embodiment is formed into cross-section substantially of an I-shape that two rails are connected at a columnar portion thereof. Also, a sliding projection formed in each of the two rails comprises an outer side surface of sliding projection which forms an outer portion of the sliding projection, an inner side surface of sliding projection which forms an inner portion of the sliding projection, and a sliding surface which slides on a cylinder inner wall of the sliding projection.

Concerning the oil ring of this embodiment, a shape of the sliding projection will be explained first.

To begin with, in the outer side surface of sliding projection which forms the outer portion of the sliding projection, it is necessary that the taper angle is in a range of 10° to 60°, more preferably in a range of 15° to 45°. The taper angle of the outer side surface of sliding projection means an angle formed between the outer sloped surface of the sliding projection and a radial direction of the oil ring. More specifically, as shown in FIG. 2, the taper angle is an angle "α" formed between a straight line "A" which is in parallel to the radial direction of the oil ring, and the outer side surface of sliding projection 7.

In this embodiment, when the taper angle of the outer side surface of sliding projection is out of the above range, this is not preferable because the possibility that the sliding projection is chipped when the oil ring is assembled into the cylinder is increased and thus, the cylinder inner wall may be scratched and the sealing performance is deteriorated.

Figure 2:
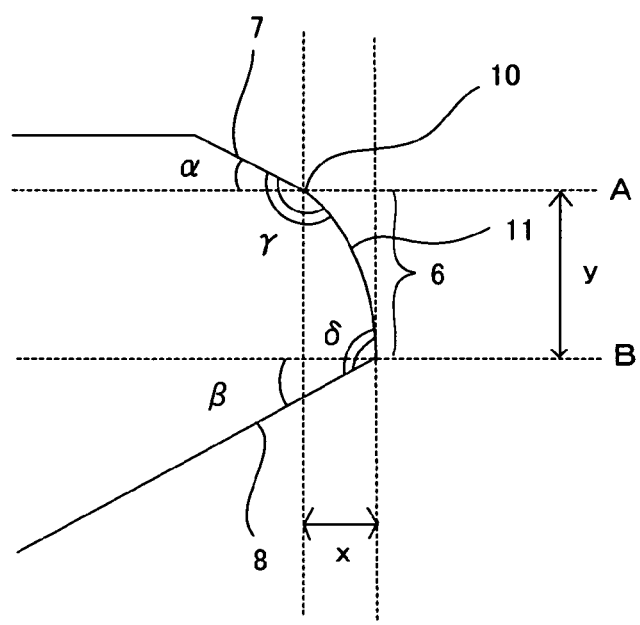
FIG. 2 is an explanatory view showing one example of a sliding projection of the present invention.

Moreover, by making the taper angle of the outer side surface of sliding projection within the above range, the angle of the outer edge portion, that is, angle "γ" of the member side which is formed in between the outer side surface of sliding projection 7 and the sliding surface 6 can largely be secured as shown in FIG. 2. Therefore, even if the oil ring is inclined and the outer edge portion is strongly pushed against the cylinder inner wall, it is possible to prevent high pressure from concentrating on a small area and thus, the sliding friction can be prevented from increasing.

It is preferable that the taper angle of the inner side surface of sliding projection which forms the inner portion of the sliding projection is in a range of 0° to 30°. The taper angle of the inner side surface of sliding projection means an angle formed in between the inner sloped surface of the sliding projection and the radial direction of the oil ring. More specifically, as shown in FIG. 2, the taper angle is angle "β" formed in between a straight line "B", which is in parallel to the radial direction of the oil ring, and the inner side surface of sliding projection 8. By making the taper angle of the inner side surface of sliding projection within this range, an angle of the joining portion between the sliding surface and the inner side surface of sliding projection, that is, as shown in FIG. 2, angle "δ" of the member side which is formed in between the inner side surface of sliding projection 8 and the sliding surface 6 can largely be secured. Thus, when the joining portion contacts with the cylinder inner wall, pressure is prevented from concentrating on this portion, and the sliding friction can be reduced. Further, since the working is easy, this is advantageous for the producing efficiency.

Figure 4:
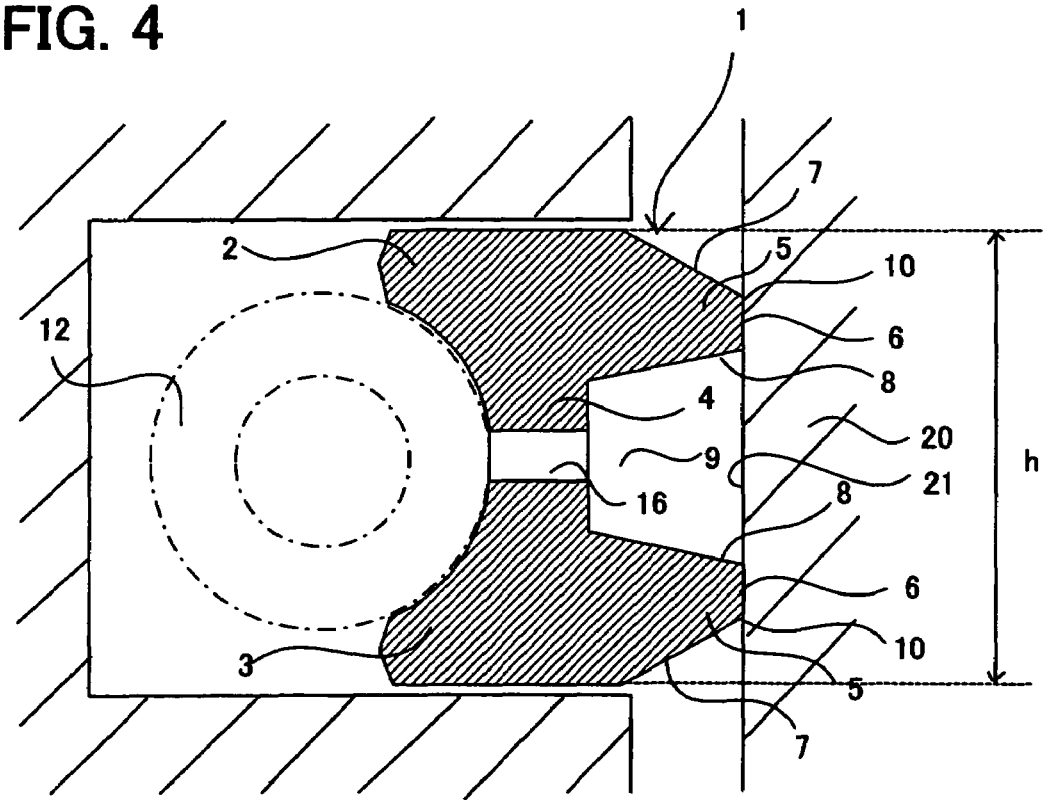
FIG. 4 is a schematic sectional view showing one example of a conventional oil ring.
Figure 5:
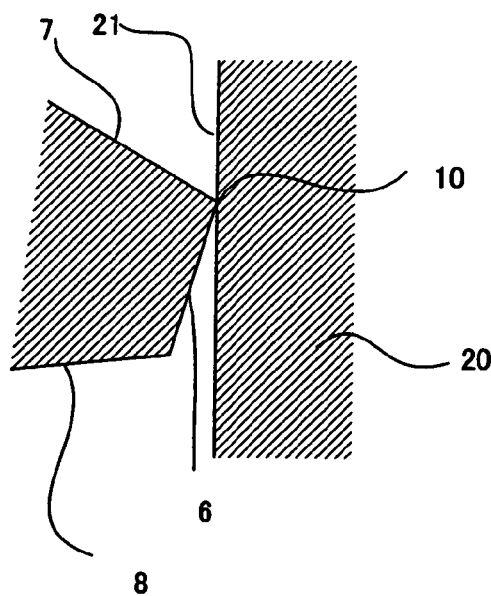
FIG. 5 is a schematic sectional view showing a state of an outer edge portion being in contact with a cylinder inner wall when the conventional oil ring is inclined.

Further, in this embodiment, the outer edge portion at which the outer side surface of sliding projection and the sliding surface are joined to each other is formed into the curved surface. Conventionally, as shown in FIG. 4, the outer edge portion 10 was formed in a horn-like shape. If the outer edge portion has a horn-like shape, when the oil ring is inclined and contacts obliquely against the cylinder inner wall, the outer edge portion 10 comes into contact with the cylinder inner wall 21 at its edge portion as shown in FIG. 5. By this, excessive pressure concentrates on the outer edge portion 10 and thus, the sliding friction is largely increased. In this embodiment, however, since the outer edge portion is formed into the curved surface, it is possible to prevent excessive or extreme pressure from concentrating on the outer edge portion. As a result, the sliding friction can be reduced. With the synergistic effect with the taper angle of the above mentioned outer side surface of sliding projection, it is possible to improve the effect of preventing the sliding friction from increasing.

Figure 3:
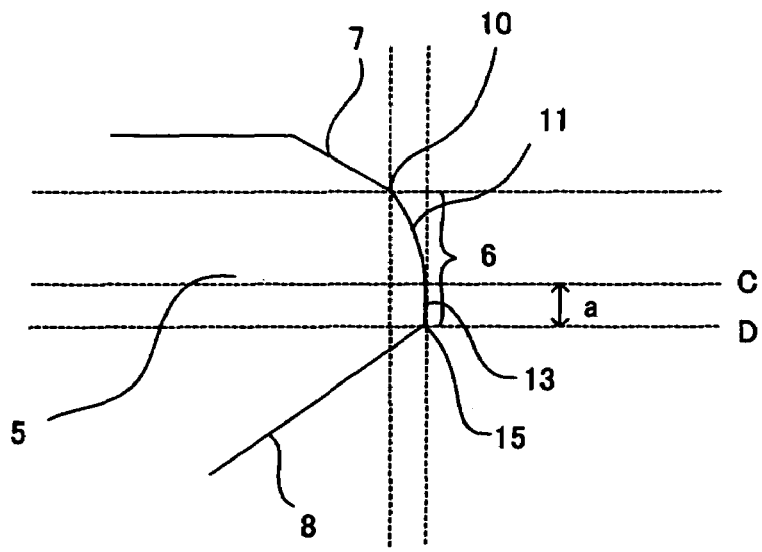
FIG. 3 is an explanatory view showing another example of the sliding projection of the present invention.

The sliding surface of this embodiment comprises a curved surface sliding portion which is joined to the outer side surface of sliding projection and is formed into a gently curved surface. The curved surface sliding portion is not especially limited as long as it is joined to the outer side surface of sliding projection and is formed into a gently curved surface. Moreover, the provision of the curved surface sliding portion is not particularly limited as long as it is provided at least on a portion from the outer edge portion to the sliding surface. For example, the entire sliding surface 6 may be the curved surface sliding portion 11 as shown in FIG. 2, or as shown in FIG. 3, the sliding surface 6 may comprise the curved surface sliding portion 11 formed on a portion from the outer edge portion 10 and the remaining portion may be a flat surface sliding portion 13 which is formed into a flat surface.

By providing the sliding surface with the curved surface sliding portion in this manner, the outer edge portion can be formed into the curved surface. Therefore, as mentioned above, with the synergistic effect with the taper angle of the outer side surface of sliding projection, the improved sliding friction reducing effect can be obtained.

In such a sliding surface, it is preferable that the curved surface sliding portion and the inner side surface of sliding projection are joined to each other. That is, as shown in FIG. 2, it is preferable that the entire sliding surface 6 is the curved surface sliding portion 11. By forming the entire sliding surface into the curved surface, since the sliding surface always comes into contact with the cylinder inner wall at its curved surface, the compliance to the cylinder inner wall is excellent, the scraping-off function of lubricating oil and the oil control function can be enhanced, and the sliding friction can be reduced.

Figure 9:
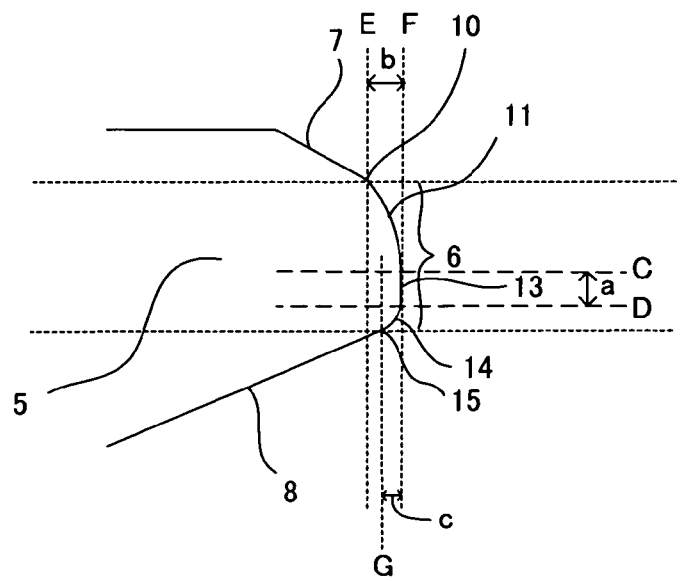
FIG. 9 is an explanatory view showing another example of the sliding projection of the present invention.

Further, in this embodiment, the sliding surface may be provided with an inner curved surface sliding portion in addition to the above mentioned curved surface sliding portion. The inner curved surface sliding portion is not particularly limited as long as it is joined to the inner side surface of sliding projection and is formed into the curved surface. Further, the provision of the inner curved surface sliding portion is not particularly limited as long as it is provided at least on a portion from an inner edge, at which the sliding surface and the inner side surface of sliding projection are joined to each other, to the sliding surface. For example, as shown in FIG. 9, the sliding surface 6 may comprise the curved surface sliding portion 11 which is formed on a portion from the outer edge portion 10, the flat surface sliding portion 13 which is a flat portion formed continuously to the curved surface sliding portion 11, and an inner curved surface sliding portion 14 which is joined to the flat surface sliding portion 13 and is formed into a gently curved surface. Alternatively, the sliding surface 6 may not be provided with the flat surface sliding portion 13 shown in FIG. 9, the curved surface sliding portion 11 and the inner curved surface sliding portion 14 may be formed continuously, and the entire sliding surface 6 may be formed into the curved surface from the outer edge portion 10 to the inner edge portion 15. Since the inner edge portion 15 can be formed into the curved surface by providing the inner curved surface sliding portion 14 in this manner, when the oil ring is inclined and contacts against the cylinder inner wall obliquely, it is possible to prevent excessive pressure from concentrating on one point and the sliding friction can be reduced.

In the present embodiment, as shown in FIGS. 3 and 9 for example, when the flat surface sliding portion 13 is provided at a portion of the sliding surface 6, it is preferable that a length of the flat surface sliding portion 13 in the axial direction of the oil ring is in a range of 5 µm to 100 µm, more preferably in a range of 50 µm to 100 µm. In the case shown in FIG. 3, the length of the flat surface sliding portion in the axial direction of the oil ring means a distance "a" between a straight line "C" parallel to the radial direction of the oil ring which crosses a joining portion of the flat surface sliding portion 13 and the curved surface sliding portion 11, and a straight line "D" parallel to the radial direction of the oil ring which crosses a joining portion of the sliding surface 6 and the inner side surface of sliding projection 8, that is, the inner edge portion 15. On the other hand, in the case shown in FIG. 9, although the inner curved surface sliding portion 14 is provided, it means a distance "a", between a straight line "C" parallel to the radial direction of the oil ring which crosses a joining portion of the flat surface sliding portion 13 and the curved surface sliding portion 11, and a straight line "D" parallel to the radial direction of the oil ring which crosses a joining portion of the sliding surface 6 and the inner side surface of sliding projection 8, that is, the inner edge portion 15.

When the flat surface sliding portion is provided on a portion of the sliding surface in this manner, if the oil ring is vertically moved in its normal state, the flat surface sliding portion is in contact with the cylinder inner wall. That is because by setting the length of the flat surface sliding portion in the axial direction of the oil ring in the above range, there is few possibility of deteriorating the scraping-off function of oil and oil control function.

In such a sliding surface, a width in the radial direction of the oil ring, which is from a portion where the curved surface sliding portion and the outer side surface of sliding projection are joined to each other, to a portion where the sliding surface and the inner side surface of sliding projection are joined to each other, more specifically as shown in FIG. 2, a width (barrel height) "x" in the radial direction of the oil ring, from a portion where the curved surface sliding portion 11 and the outer side surface of sliding projection 7 are joined to each other, that is, from the outer edge portion 10 to a portion where the sliding surface 6 and the inner side surface of sliding projection 8 are joined to each other is preferably in a range of 3 µm to 100 µm, more preferably in a range of 3 µm to 30 µm, particularly preferably in a range of 10 µm to 20 µm. By setting the width of the sliding surface in the radial direction of the oil ring within the above range, it is possible to reduce the sliding friction without deteriorating a function of the oil ring.

On the other hand, a width of the curved surface sliding portion in the radial direction of the oil ring when the inner curved surface sliding portion is provided, that is, as shown in FIG. 9, a distance "b" between a straight line "E" parallel to the axial direction of the oil ring which crosses the outer edge portion 10, a straight line "F" parallel to the axial direction of the oil ring which crosses the outermost portion in the radial direction of the oil ring of the curved surface sliding portion 11, is preferably in a range of 3 µm to 100 µm, more preferably in a range of 3 µm to 50 µm, particularly preferably in a range of 3 µm to 30 µm, and further preferably in a range of 10 µm to 20 µm.

Further, a width of the inner curved surface sliding portion in the radial direction of the oil ring, that is, a distance "c" between a straight line "G" parallel to the axial direction of the oil ring which crosses the inner edge portion 15, and a straight line "F" parallel to the axial direction of the oil ring which crosses the outermost portion in the radial direction of the oil ring of the inner curved surface sliding portion 14, is preferably in a range of 3 µm to 100 µm, more preferably in a range of 3 μm to 50 μm, particularly preferably in a range of 3 μm to 30 μm, and further preferably in a range of 5 μm to 15 μm.

When the inner curved surface sliding portion is provided, though relation between a width of the curved surface sliding portion in the radial direction of the oil ring and a width of the inner curved surface sliding portion in the radial direction of the oil ring, that is, relation between the distance "b" and the distance "c" shown in FIG. 9 is not particularly limited, it is preferable that the distance "b" is larger than the distance "c". This is because that the sliding friction can be reduced and the working is easy.

Next, a width of the sliding surface in the axial direction of the oil ring will be explained. Here, the sliding surface width in the axial direction of the oil ring means a width in the axial direction of the oil ring from the outer edge portion to a joining portion of the sliding surface and the inner side surface of sliding projection. More specifically, as shown in FIG. 2, it means a width "y" between a straight line "A" parallel to the radial direction of the oil ring which crosses the outer edge portion 10 and a straight line "B" parallel to the radial direction of the oil ring which crosses a joining portion of the sliding surface and the inner side surface of sliding projection. And in this embodiment, this width is equal value to a sum of both widths of the upper and lower rails. In the present embodiment, it is preferable that this sliding surface width in the axial direction of the oil ring is in a range of 0.05 mm to 0.3 mm, more preferably in a range of 0.1 mm to 0.2 mm. In order to reduce the weight of the piston ring and to reduce the oil consumption, generally in an oil ring, it is preferable to reduce the width of the oil ring in its axial direction. When the sliding surface width is in the above range, this requirement can be satisfied. Further, as the width of the oil ring becomes thinner, the possibility of fluttering of the oil ring in the high speed revolution region of the piston becomes higher, and the sliding friction maybe increased. In the present embodiment, such a problem caused by reducing the width of the oil ring can sufficiently be prevented.

The width of the oil ring in its axial direction of this embodiment is not particularly limited as long as the scraping-off function of lubricating oil of the oil ring or and the oil control function of lubricating oil are not hindered.

Here, the width of the oil ring in the axial direction thereof means a width of the oil ring in the axial direction thereof from an upper surface of the upper rail to a lower surface of the lower rail in the upper and lower rails which constitute the oil ring. More specifically, as shown in FIG. 1, it means a width "i" of the oil ring in the axial direction thereof from the upper surface of the upper rail 2 to the lower surface of the lower rail 3. In this embodiment, it is preferable that the width of the oil ring in the axial direction thereof is, specifically, in a range of 1 mm to 3 mm, more preferably in a range of 1.2 mm to 2 mm. This is because that in order to reduce the weight of the piston ring and to reduce the consumption of lubricating oil, as mentioned above, it is preferable that the width of the oil ring in the axial direction thereof is smaller. Moreover, the present embodiment has an effect to reduce the sliding friction which increases due to the inclined oil ring occurring especially in the high speed revolution region of the piston, in the oil ring having the thin width in the above range in many cases.

A tension of the oil ring of this embodiment is not particularly limited as long as the oil ring can suitably urge the cylinder inner wall, but more specifically, it is preferable that an oil ring tension ratio (N/mm), a value obtained by dividing an oil ring tension (N) by a ring bore diameter (mm), is 0.5 N/mm or lower, and more preferably 0.2 N/mm or lower. An oil ring having the tension in the above range is generally called a low tension oil ring. This is because that in such a low tension oil ring, the fluttering is less likely to be generated in the oil ring in the low speed revolution region of the piston, but the fluttering is likely to be generated in the high speed revolution range, and the effect of the embodiment can sufficiently be exhibited.

Figure 6A:
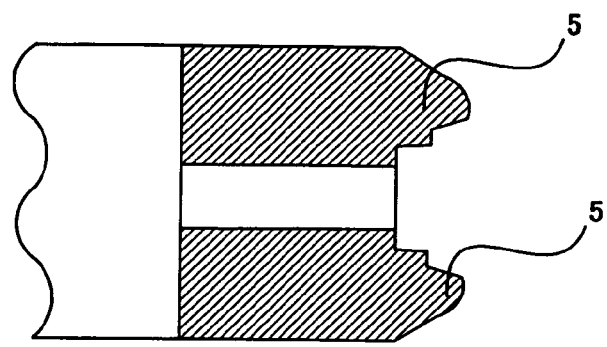
FIGS. 6A and 6B are schematic sectional views showing other examples of the oil ring of the present invention.
Figure 6B:
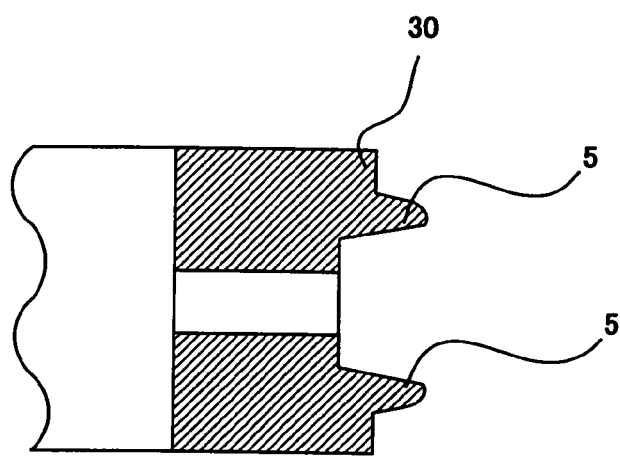

The overview of the oil ring of this embodiment has the cross-section substantially of an I-shape that two rails are connected at a columnar portion thereof, and as long as the sliding projection has the above described shape, the oil ring is not particularly limited. For example, a shape in which the inner portions of the sliding projections 5 are formed in a stepwise shape as shown in FIG. 6(A), a shape in which the sliding projections 5 are provided inward in the axial direction of the oil ring 1 and generally called shoulders 30 are formed axially outward as shown in FIG. 6(B), or the like can be listed.

In the present invention, as a surface treatment film which is carried out on the sliding surface and the sliding projection, it is preferable to form a gas nitride film, an ion nitride film, an ion plating film, a diamond-like carbon film, or a hard carbon film containing metal. The gas nitride film can be formed over the entire periphery if a mask is not used. In the present invention, the gas nitride film may be formed on only an outer periphery or on the entire periphery, and a location where the film is formed may be appropriately selected.

The ion nitride film or the ion plating film among the above surface treatment is preferably formed only on the outer peripheral surface. Specific examples of types of the ion plating film are a Cr—N type film, a Cr—B—N type film, a Ti—N type film and the like.

When a hard film as mentioned above is formed, if the sliding surface and the inner side surface of the sliding projection on the lower side of the sliding surface have sharp edges, chip or peeling are likely to be generated and thus, it is preferable that the surfaces have gently curved surfaces (R-surfaces).

In the present embodiment, material for forming the oil ring is not particularly limited as long as it has an appropriate toughness, and when the oil ring is a two-piece oil ring, as long as the material is not deformed by tension from the expander, specifically, steel which is used in the conventional oil ring. Among the above, martensitic stainless steel (SUS440, SUS410 material), 10Cr, 8Cr, alloy tool steel (SKD material), SKD61, SWOSC—V, SWRH equivalent and the like are preferably used.

2. Others

The oil ring of the embodiment may be a one-piece oil ring comprising only the oil ring having the above mentioned composition, or may be a two-piece oil ring in which the oil ring of the present embodiment is combined with the expander which urges the oil ring radially outward.

The expander used as the two-piece oil ring is not particularly limited as long as the expander is formed so as to generate a spreading force toward the oil ring in the radial direction thereof. For example, a ring-like shape one obtained by winding a wire rod, having a circular cross section, into a coil-like shape and grinding the outer peripheral surface of the coil expander may be used. Although the example of the coil expander shown in FIG. 1 has a circular cross section, its shape is not limited to the above described shape. This expander may be a plate expander instead of the above mentioned coil expander.

B. Second Embodiment

Next, the second embodiment will be explained. In the present embodiment, an oil ring is formed into cross-section substantially of an I-shape that two rails are connected at a columnar portion thereof, wherein a sliding projection formed in each of the two rails comprises an outer side surface of sliding projection which forms an outer portion of the sliding projection, a inner side surface of sliding projection which forms an inner portion of the sliding projection, and a sliding surface which slides on a cylinder inner wall and forms a tip end of the sliding projection; wherein the at least a portion from an outer edge portion, where the outer side surface of sliding projection and the sliding surface are joined to each other, of the outer side surface of sliding projection is formed into a curved surface; and wherein the outer edge portion is formed into a curved surface, and the sliding surface has a curved surface sliding portion which is joined to the outer side surface of sliding projection and formed into a gently curved surface.

In this embodiment, like the first embodiment, by providing the sliding surface with the curved surface sliding portion, when the oil ring is inclined and is contacted to the cylinder inner wall obliquely, the outer edge portion, which comes into contact with the cylinder inner wall, will come into contact by the curved surface. Therefore, it is possible to prevent excessive pressure from concentrating on the outer edge portion, and to reduce the sliding friction.

Further in this embodiment, at least a portion of the outer side surface of sliding projection is formed into the curved surface from the outer edge portion. In the outer side surface of sliding projection, since at least a portion thereof is formed into the curved surface from the outer edge portion in this manner, a portion where the outer side surface of sliding projection and the curved surface sliding portion are joined to each other, that is, the outer edge portion can be formed into more gently curved surface.

Figure 8:
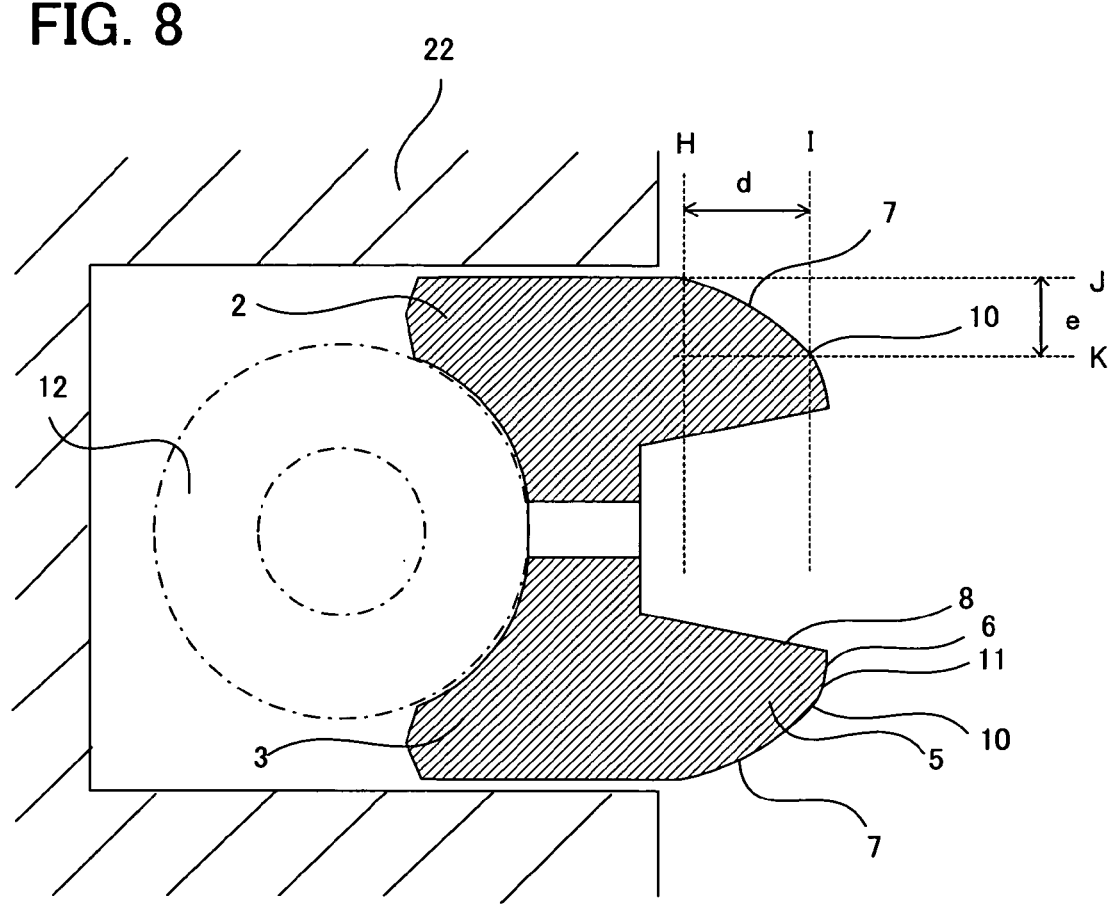
FIG. 8 is a schematic sectional view showing another example of the oil ring of the present invention.

In this embodiment, a portion of the outer side surface of sliding projection which is formed into the curved surface is not particularly limited as long as it is at least a portion of the outer side surface of sliding projection from the portion where it is joined to the outer edge portion. As shown in FIG. 8, the entire outer side surface of sliding projection 7 may be formed into the curved surface, or a portion may be formed into the curved surface from the outer edge portion 10.

In the outer side surface of sliding projection having the portion formed into the curved surface, a width in the radial direction of the oil ring of the portion thereof which is formed into the curved surface, that is as shown in FIG. 8, a distance "d" between a straight line "H" parallel to the axial direction of the oil ring which crosses the innermost portion in the radial direction of the oil ring of the outer side surface of sliding projection 7 formed into the curved surface, and a straight line "I" parallel to the axial direction of the oil ring which crosses the outer edge portion 10 is preferably in a range of 50 μm to 500 μm. On the other hand, a width in the radial direction of the oil ring of the portion formed into the curved surface in the outer side surface of sliding projection, that is as shown in FIG. 8, a distance "e" between a straight line "J" parallel to the radial direction of the oil ring which crosses the innermost portion in the radial direction of the oil ring of the outer side surface of sliding projection 7 formed into the curved surface, and a straight line "K" parallel to the radial direction of the oil ring which crosses the outer edge portion 10 is preferably in a range of 10 μm to 200 μm. By setting the shape of the outer side surface of sliding projection of the portion formed into the curved surface in the above range, it is easy to work the outer edge portion more gently.

The present invention is not limited to the above embodiments. The embodiments are exemplifications, and those which have substantially the same technical idea as described in claims and which exhibit the same effect are included in the technical scope of the present invention.

EXAMPLES

The present invention will be further explained below referring to an example.

[Unit Test]

First, concerning the oil ring of the present invention, a mechanical loss (FMEP) caused by friction was obtained using a unit tester. A test method in this case is as follows. The oil ring was set in a piston, running-in was carried out, and then, the friction was measured by changing the number of revolution, which corresponds to engine speed, at the oil temperature of 80°.

For the oil ring used in the example, a wire rod for a piston ring comprising the following elements was used: Cr: 8.0 wt %, C: 0.72 wt %, Si: 0.25 wt %, Mn: 0.28 wt %, P: 0.02 wt %, S: 0.01 wt % and other unavoidable impurities. The piston ring wire rod was subjected to a drawing and known working (grinding and the like), and the surface was further subjected to gas nitriding to form a diffused layer of Hv700 or more and thickness of 100 μm. A barrel amount (barrel height) was adjusted by adjusting the angle of a set jig and processing time, and an outer peripheral sliding surface was subjected to barrel working.

A specification of the piston ring produced by the above method is as follows (for "y", "α" and "β", see FIG. 2).

Oil ring "d1": 81 mm, "h1": 2 mm, "a1": 2 mm,
Width "y" of rail=0.2 mm
Chamfering angle "α": 25°, Chamfering angle "β": 10°
Abutment gap: 0.1 mm
Tension ratio of oil ring is 0.19 N/mm Further, a wire rod of φ0.6 mm was used for an expander, a diameter of the expander was 1.5 mm and pitch thereof was 0.6 mm.

In the present example, the FMEP of the following four kinds of oil rings were measured: an oil ring which was not subjected to the barrel processing (STD), and three oil rings each having values of (barrel height) "x" in FIG. 2 of 8 μm, 15 μm and 25 μm. A result of the measurement is shown in FIG. 10.

Figure 10:
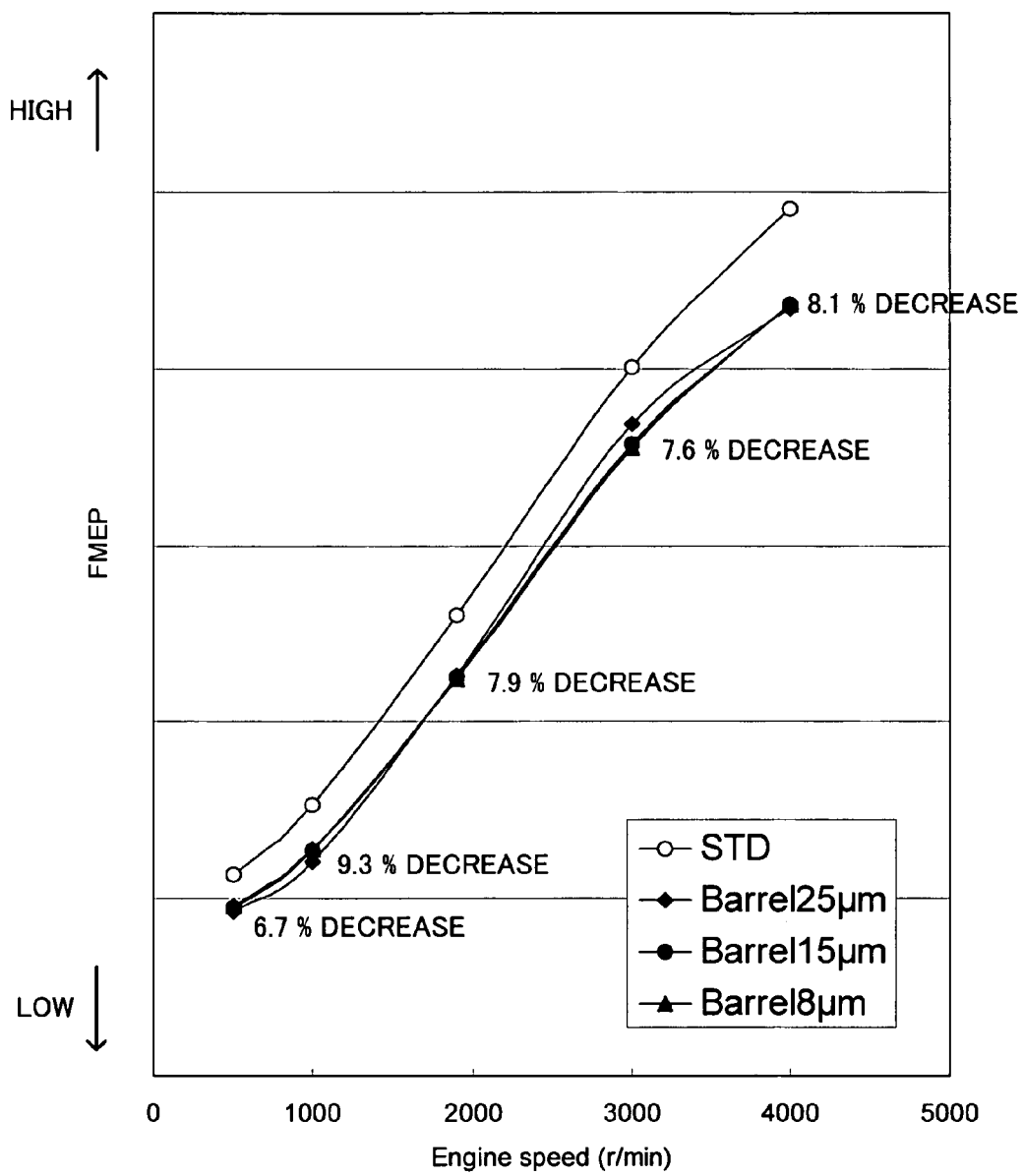
FIG. 10 is a graph showing mechanical loss (FMEP) of the oil ring with respect to the number of engine revolution in the example of the present invention.

It is obvious from FIG. 10 that the oil rings having the barrel surfaces have lower FMEP than the STD in any of the revolution ranges, irrespectively of the barrel height. In order to maintain the contacting width at a small value, it is preferable that the barrel amount (barrel height) is high. From the above, it is obvious that the friction can be reduced by forming the sliding surface into a barrel-faced shape.

[Test Using Actual Machine]

For the above oil rings, the consumption of oil was confirmed using a four-cylinder gasoline engine having displacement of 2694 cc and bore diameter of φ95 mm.

The combination of piston rings used in this test is as follows: a first ring was made of 10Cr material having h1 of 1.2 mm, a1 of 2.9 mm and subjected to the gas nitriding, and a second ring was made of FC material and having "h1" of 1.2 mm and a1 of 3.4 mm. Oil rings having the same specification (STD and barrel specification) of the outer peripheral shape as those used in the unit test. In this test, the specifications of the first and second rings are constant, and only the oil rings were changed. As the oil rings, barrel-faced shaped oil rings having the (barrel height) "x" values within a range of 15 to 20 μm were used.

[Test Method]

Figure 11:
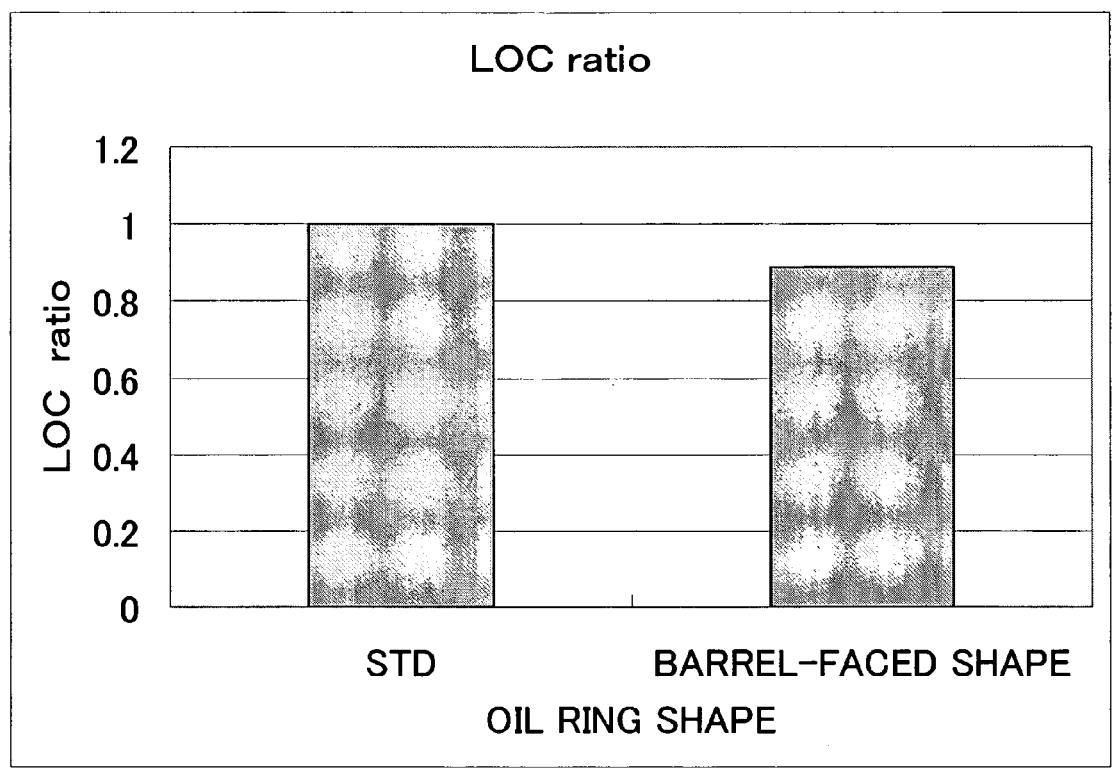
FIG. 11 is a graph showing an oil consumption rate of the oil ring in the example of the present invention.

At WOT (full load) and number of engine revolution of 5200 rpm, a value of the consumption of oil (g/h) using the STD oil ring was defined as 1, and the test result using the barrel-faced shaped oil ring was obtained as indexes (oil consumption ratio). A result thereof is shown in FIG. 11.

From this result, it is obvious that the test result using the barrel shaped oil ring has low values of the oil consumption ratio and excellent result can be obtained. A difference of the values was about 11%.

INDUSTRIAL APPLICABILITY

According to the present invention, the taper angle of the outer side surface of sliding projection is in the range of 10° to 60°, the outer edge portion where the outer side surface of sliding projection and the sliding surface are joined to each other is formed into a curved surface, the sliding surface has the curved surface sliding portion which is joined to the outer side surface of sliding projection and formed into a gently curved surface. With this configuration, when the oil ring is adversely inclined and contacts to the cylinder inner wall obliquely, the outer edge portion which comes into contact with the cylinder inner wall can come into contact at its curved surface. Therefore, it is possible to prevent excessive pressure from concentrating on the outer edge portion, to reduce the sliding friction and to reduce the consumption of oil.

The invention claimed is:

1. An oil ring formed into cross-section substantially of an I-shape that two rails are connected at a columnar portion thereof, wherein a sliding projection formed in each of the two rails comprises an outer side surface of sliding projection which forms an outer portion of the sliding projection, a inner side surface of sliding projection which forms an inner portion of the sliding projection, and a sliding surface which slides on a cylinder inner wall and forms a tip end of the sliding projection;

wherein a taper angle of the outer side surface of sliding projection is in a range of 10° to 60°;

said sliding surface is not in symmetry about the center line;

an outer edge portion, where the outer side surface of sliding projection and the sliding surface are joined to each other, is formed into a curved surface, and the sliding surface has a curved surface sliding portion which is joined to the outer side surface of sliding projection and formed into a gently curved surface; and a radial width of the oil ring, which is from the portion where the curved surface sliding portion and the outer side surface of sliding projection are joined to each other to the portion where the sliding surface and the inner side surface of sliding projection are joined to each other, is from 3 μm to 100 μm.

2. An oil ring formed into cross-section substantially of an I-shape that two rails are connected at a columnar portion thereof, wherein a sliding projection formed in each of the two rails comprises an outer side surface of sliding projection which forms an outer portion of the sliding projection, a inner side surface of sliding projection which forms an inner portion of the sliding projection, and a sliding surface which slides on a cylinder inner wall and forms a tip end of the sliding projection;

wherein at least a portion from an outer edge portion, where the outer side surface of sliding projection and the sliding surface are joined to each other, of the outer side surface of sliding projection is formed into a curved surface;

the outer edge portion is formed into a curved surface, and the sliding surface has a curved surface sliding portion which is joined to the outer side surface of sliding projection and formed into a gently curved surface;

said sliding surface is not in symmetry about the centerline, and a radial width of the oil ring, which is from the portion where the curved surface sliding portion and the outer side surface of sliding projection are joined to each other to the portion where the sliding surface and the inner side surface of sliding projection are joined to each other, is from 3 μm to 100 μm.

3. The oil ring according to claim 1, wherein the curved surface sliding portion and the inner side surface of sliding projection are joined to each other.

4. The oil ring according to claim 2, wherein the curved surface sliding portion and the inner side surface of sliding projection are joined to each other.

5. The oil ring according to claim 1, wherein an inner edge portion where the inner side surface of sliding projection and the sliding surface are joined to each other is formed into a curved surface, and the sliding surface has an inner curved surface sliding portion which is joined to the inner side surface of sliding projection and formed into a gently curved surface.

6. The oil ring according to claim 2, wherein an inner edge portion where the inner side surface of sliding projection and the sliding surface are joined to each other is formed into a curved surface, and the sliding surface has an inner curved surface sliding portion which is joined to the inner side surface of sliding projection and formed into a gently curved surface.

7. The oil ring according to claim 1, wherein a taper angle of the inner side surface of sliding projection is in a range of 0° to 30°.

8. The oil ring according to claim 2, wherein a taper angle of the inner side surface of sliding projection is in a range of 0° to 30°.

* * * * *